US009940450B2

(12) United States Patent
Bowers (10) Patent No.: US 9,940,450 B2
(45) Date of Patent: *Apr. 10, 2018

(54) METHOD AND APPARATUS FOR MANAGING CONFIDENTIAL INFORMATION (71) Applicant: Charles R. Bowers, Portland, OR (US)

(72) Inventor: Charles R. Bowers, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,192

(22) Filed: Jun. 15, 2015

(65) Prior Publication Data

US 2016/0162682 A1 Jun. 9, 2016

Related U.S. Application Data (63) Continuation of application No. 13/685,349, filed on Nov. 26, 2012, now Pat. No. 9,218,507, which is a continuation-in-part of application No. 12/777,012, filed on May 10, 2010, now Pat. No. 8,321,685, which is a continuation of application No. 11/955,306, filed on Dec. 12, 2007, now Pat. No. 7,716,493, which is a continuation of application No. 10/623,337, filed on Jul. 18, 2003, now Pat. No. 7,334,130.

(60) Provisional application No. 60/397,032, filed on Jul. 19, 2002.

(51) Int. Cl.
G06F 7/04 (2006.01)
G06F 21/44 (2013.01)
G06F 21/32 (2013.01)
G06F 21/78 (2013.01)
G06F 21/62 (2013.01)

(52) U.S. Cl.
CPC .............. *G06F 21/44* (2013.01); *G06F 21/32* (2013.01); *G06F 21/6254* (2013.01); *G06F 21/78* (2013.01); *G06F 21/6245* (2013.01)

(58) Field of Classification Search
CPC ...... G06F 21/44; G06F 21/6254; G06F 21/32; G06F 21/78; G06F 21/6245
USPC ...................... 713/172, 186; 726/5–9, 25–28
See application file for complete search history.

(56) References Cited

U.S. PATENT DOCUMENTS

| 6,035,398 | A * | 3/2000 | Bjorn | G06K 9/00006 713/185 |
| 6,944,761 | B2 * | 9/2005 | Wood | G06F 21/31 713/155 |
| 7,085,925 | B2 * | 8/2006 | Hanna | H04L 9/3263 713/155 |
| 7,143,292 | B2 * | 11/2006 | Hamada | G06F 21/10 713/182 |
| 7,200,756 | B2 * | 4/2007 | Griffin | G06Q 20/105 705/41 |
| 2003/0101348 | A1 * | 5/2003 | Russo | G06K 9/00026 713/185 |
| 2007/0022196 | A1 * | 1/2007 | Agrawal | G06F 21/34 709/225 |

* cited by examiner

*Primary Examiner* — Samson Lemma
(74) *Attorney, Agent, or Firm* — Forrest Law Office, P.C.

(57) ABSTRACT

The invention is a method and apparatus for managing the secure acquisition, storage and disclosure of confidential information, to facilitate identity rights management; and/or preemptively authorized data querying techniques to preserve the anonymity of disclosed personal data.

4 Claims, 8 Drawing Sheets

METHOD AND APPARATUS FOR MANAGING CONFIDENTIAL INFORMATION

CROSS REFERENCE TO RELATED APPLICATIONS

This application is a continuation of U.S. patent application Ser. No. 13/685,349 filed Nov. 26, 2012, which in turn is a continuation-in-part of U.S. Pat. No. 8,321,685 filed May 10, 2010, which in turn is a continuation of U.S. Pat. No. 7,716,493 filed Dec. 12, 2007, which in turn is a continuation of U.S. Pat. No. 7,334,130 filed Jul. 18, 2003, which claims the benefit of U.S. Provisional Patent Application Ser. No. 60/397,032 filed Jul. 19, 2002. All of which are hereby incorporated by reference in their entirety for all purposes.

TECHNICAL FIELD

The present invention relates to the field of confidential information management system. In particular, the present invention relates to preemptive applications of a confidential information management system used to provide secure acquisition, storage and disclosure of confidential information.

BACKGROUND

Throughout history and across all cultures, societies have engaged in a balancing act between the virtues of a society in which thoughts and information flow freely, and the benefits of privacy and security. The tension between these social objectives is seen in many areas.

In the context of industrial and technological development, societies wish to encourage the creation of new and useful ideas. To do so, society must on one hand give creative citizens the right to own, profit from and protect the confidentiality of their own creative ideas. On the other hand, society must also compel the open disclosure of those creative ideas for the benefit of all. This tension is played out in the creation and enforcement of intellectual property laws.

In the context of business and commerce, society seeks the broad dissemination of market information to reduce the friction and inefficiencies of commercial transactions. On the other hand, society also wishes to protect the privacy of individuals and businesses whose commercial profiles constitute that market information. This tension is played out in the creation and enforcement of privacy laws.

In the broader social context, while all societies have an interest in knowing about and regulating their citizens for the safety of society as a whole, many societies also choose to protect the freedom and privacy of their citizens from government intrusion. Highly regulated societies in which the government scrutinizes the activities of its own citizens often have very low crime rates and a secure environment, while very open societies that protect privacy and anonymity must often tolerate higher crime rates and a less secure social environment. This tension is played out in the laws regulating criminal investigations and law enforcement.

To date, this balancing act between the preservation of an open society and the protection of privacy has been a "zero sum game." In the arena of technological and industrial development, when society tightly guards commercial intellectual property, development of new ideas and technology can be impaired. This phenomenon is widely reported and debated with respect to copyright protection on the Internet. Many denizens of the Internet strenuously argue that "information must be free" on the Internet to promote the speedy development of new ideas. Yet many others argue that the widespread copying and dissemination of private or proprietary information on the Internet discourages innovation by undermining a creator's right to protect and benefit from his or her creations. The proponents of each side of the argument believe that to the extent one agenda is advanced, the other must be diminished.

In the context of commercial information, commercial interests strenuously seek protection of their right to "mine" and aggregate commercial databases through both traditional means and through the new "clickstream" monitoring technologies available on the Internet. On the other hand, citizens strenuously seek protection of their privacy against such Big Brother invasiveness. Here too, the proponents on each side of the debate believe that to advance one objective is to diminish the other.

A similar debate with respect to personal or other confidential information has arisen since the unnerving events of September 11th. In the United States, the events of Sep. 11, 2001 have resulted in an intense public discourse over the wisdom of adjusting our own balance from an historically open society affording a great degree of freedom and privacy for citizens, to one that sacrifices a degree of that freedom and privacy for better protection against terrorism. To date, the discourse has continued to treat the issue as a zero sum game: that is, we must decide how much privacy and anonymity we are willing to give up to be safer. From diatribes over the U.S. Patriot Act to debates on national ID cards, there is an intense interest in how the balance is adjusted.

Fortunately, biometric and database technologies have evolved to a point where addressing both areas of concern need not involve a zero sum game. In the industrial, business, commercial, law enforcement and other social contexts, the integration of these technologies to make personal or other sensitive information available to parties who need it without relinquishing control of the information or compromising our privacy and anonymity presents a unique set of challenges, requiring a new and novel solution.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, various aspects of the present invention, a method and apparatus for a confidential information management system, are described. Specific details are set forth in order to provide a thorough description. However, it is understood the embodiments of the invention may be practices with one some or all of these aspects, and with or without some or all of the specific details. Repeated usage of the phrase "in one embodiment" does not necessarily refer to the same embodiment, although it may.

In some instances, well-known techniques of confidential information management have been omitted or simplified in order not to obscure the understanding of this description. For example, specific details are not provided as to certain encryption technology used to implement the present invention as these techniques are well known by those skilled in the art.

Parts of the description are presented using terminology commonly employed to describe operations performed by a computer system or a biometric generation device. Some of these operations involve storing, transferring, combining and otherwise manipulating signals through electrical, magnetic or optical components of the system. The term "system" includes general purpose as well as special purpose arrangements of these components that are standalone, adjunct or embedded.

Figure 1:
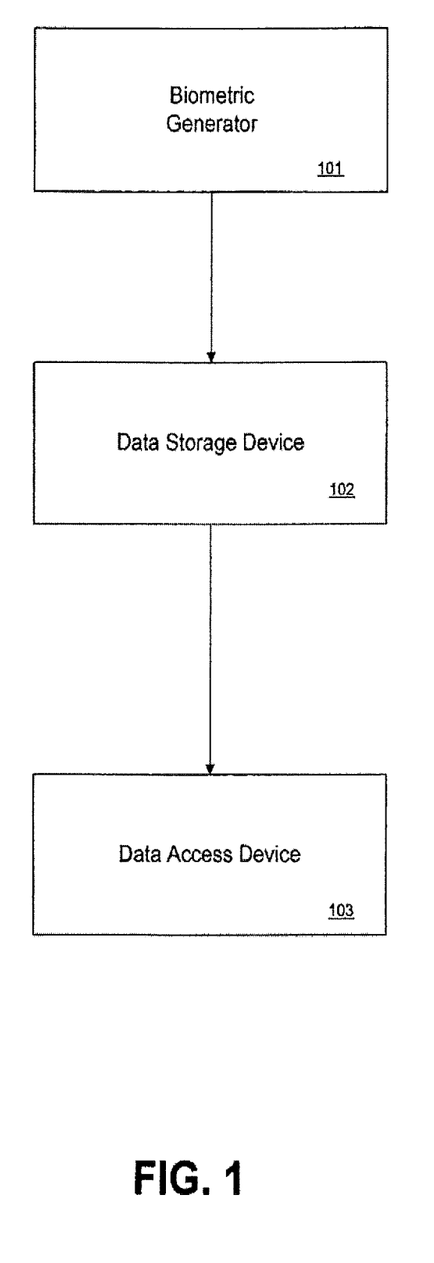
FIG. 1 is a block diagram illustrating a generalized embodiment of selected components of a confidential information management system in accordance with one embodiment of the invention, and the operating environment in which certain aspects of the invention may be practiced.

Refer now to FIG. 1, which is a block diagram illustrating a generalized embodiment of selected components of a confidential information management system in accordance with one embodiment of the invention, and the operating environment in which certain aspects of the invention may be practiced. As shown, the confidential information management system includes a biometric generator (scanner 101), a device used to analyze a highly unique biological characteristic of an individual in a manner that captures that characteristic of the individual in a reliable and replicable way. The captured unique biometric characteristic is referred to as a "biometric signature." To facilitate the disclosure of the present invention, the term "scanner" is used interchangeably with the term "biometric generator" but this is not meant as a limitation. As is understood by those in the art and contemplated by the invention, the biometric generator may include a retinal scanner, a fingerprint scanner, a face recognition system, a voice identification system, a gait analysis device, a DNA analysis system, etc. In one embodiment, the generator analyzes the results of the biological scan, analysis, etc. and converts it to a digital signature which is reliably replicable.

Each scanner 101 includes a unique identifier that enables the identification of scanner 101 as the source of the biometric signature. In one embodiment, the unique identifier of scanner 101 may be implemented as an encrypted digital serial number. However, other techniques for implementing the unique identifier may be employed without departing from the scope of the invention.

Referring again to FIG. 1, the confidential information management system further includes a data storage device (token 102) to store confidential information about the individual. Because the data storage device is usually, but not necessarily, portable and take the form of a smart card or other similar data storage medium, the term "token" is used interchangeably with the term "data storage device" in the disclosure of the present invention; however, the methods described herein are applicable to other forms of data storage. The biometric signature is bonded to token 102 so that any access to the confidential information stored on token 102 requires reconfirmation of the biometric signature. In one embodiment of the invention, bonding the biometric signature to token 102 generates a unique private encryption key used to encrypt the confidential information before storing it on token 102. Nothing on token 102, including the private encryption key, may be accessed unless token 102 is unlocked by the presentment of a biometric signature matching the biometric signature originally bonded to token 102.

Referring yet again to FIG. 1, the confidential information management system further includes a data access device (console 103), which mediates the entry of information onto, and queries against, token 102. Console 103 further facilitates the management, by the individual who is the owner of the confidential information, of the nature and scope of information requested by a querying party as well as the display of information authorized for disclosure to the querying party. In one embodiment, console 103 comprises a data input/output (I/O) mechanism, such as a card reader, a keypad, and a display. Similar to scanner 101, each console 103 includes a unique identifier that enables the identification of the source of the entry of, or access to information on token 102. In one embodiment, the unique identifier of console 103 may be implemented as an encrypted digital serial number; however, other techniques for implementing the unique identifier may be employed without departing from the scope of the invention. Alternatively, the biometric generator and the data console may be in a single unit or the matching of the biometric signatures could be done at the biometric generator.

Turning now to FIGS. 2-6, the particular methods of the invention are described in terms of software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computer causes the processor of the computer to perform an action or a produce a result.

Figure 2:
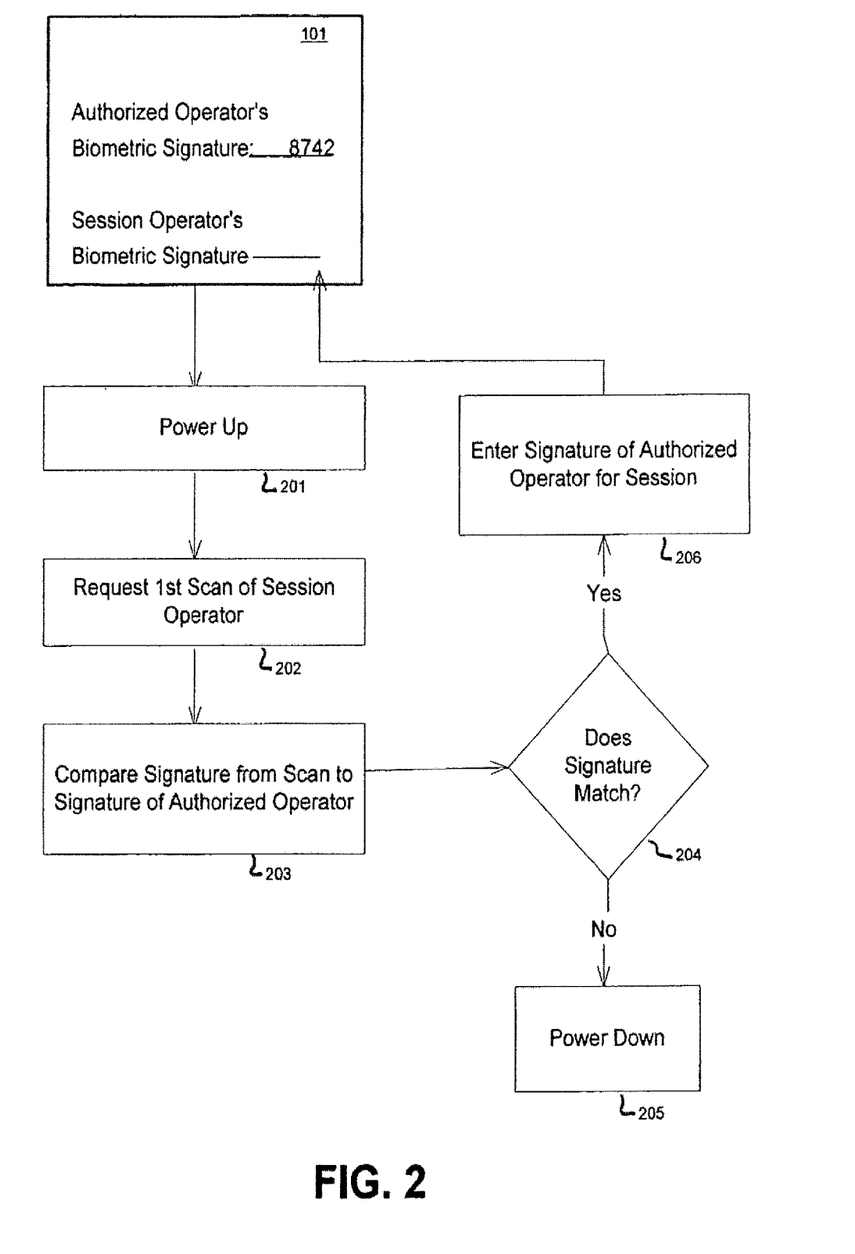
FIG. 2 is a flow diagram illustrating initializing the biometric generator, an aspect of a method to be performed by a confidential information management system in accordance with one embodiment of the invention.

FIG. 2 is a flow diagram illustrating initializing the scanner, an aspect of a method to be performed by a confidential information management system in accordance with one embodiment of the invention. One of the challenges in a confidential information management system is the ability to safeguard against rogue biometric generator operators. A rogue operator would be someone who does not have the proper authority to use biometric generator 101 or whose use of biometric generator 101 results in biometric signatures that are flawed, substandard, discredited, etc. In the embodiment illustrated in FIG. 2, scanner 101 initializes operation by requiring an operator of scanner 101 to present themselves for analysis and capture of the operator's own biometric characteristic. Scanner 101 records the operator's biometric characteristic in a short-term memory of scanner 101, along with the time and date of the analysis and capture, and further identifies the biometric characteristic as the biometric signature of the current operator. In one embodiment, scanner 101 may be further configured to operate only upon initialization by an individual, or individuals, whose biometric characteristics are included in a set of authorized biometric signatures. Initialization of scanner 101 advantageously enables subsequent data credibility checks described below, including the ability to publish the identities of rogue generator operators, and thereby discount the credibility of data on token 202 recorded by that operator. Initialization of scanner 101 also results in an increase in data credibility by allowing institutions to limit the pool of persons who are authorized to operate scanner 101.

Referring to FIG. 2, in one embodiment, scanner 101 has an authorized operator's biometric signature stored in memory. Upon power up, block 201, the request for the first scan of the session, block 202, is a scan for the current operator's biometric signature. In block 203, the current operator's biometric signature is compared to the stored authorized operator's biometric signature. If the comparison, shown in block 204, is negative, the scanner shuts down, block 205, and does not allow further scans. If the comparison, block 204, is positive, the current operator is the authorized operator and, as shown in block 206, his biometric signature is entered as the session operator of scanner 101.

Figure 3:
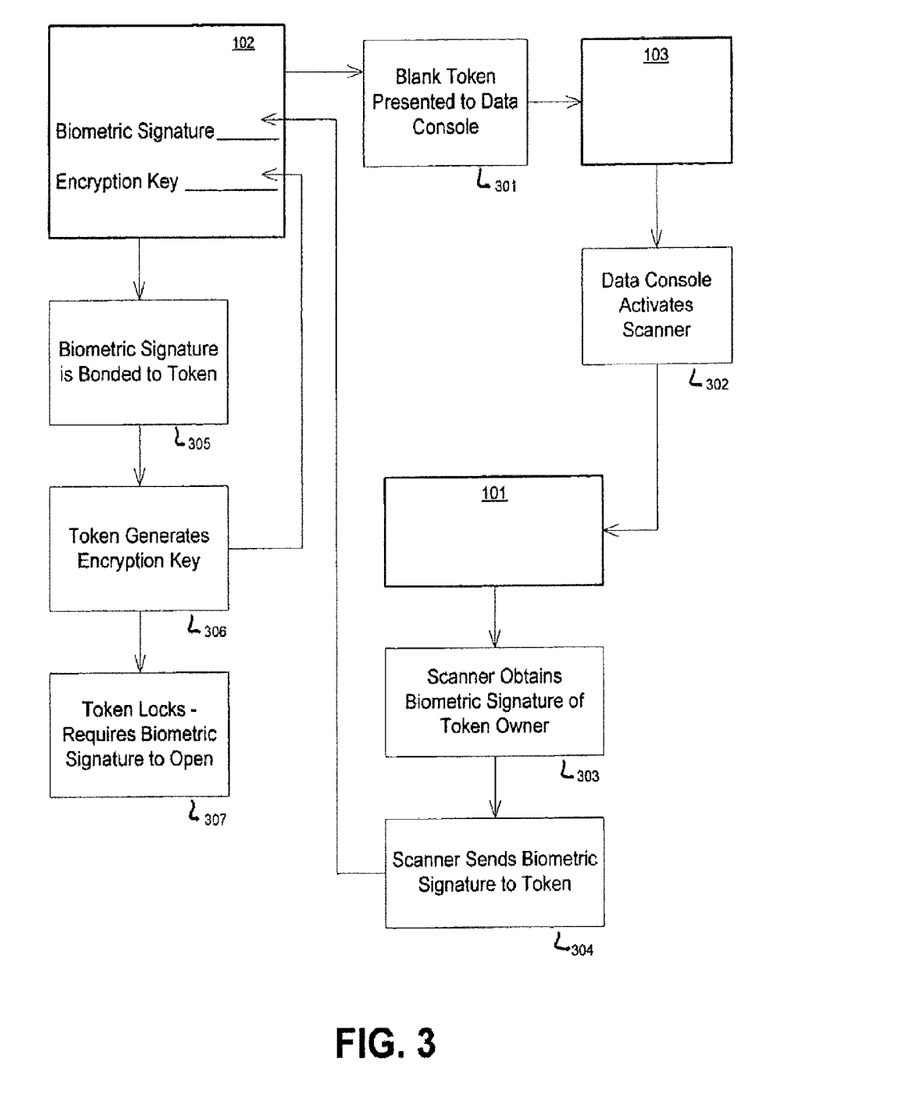
FIG. 3 is a flow diagram illustrating bonding a biometric signature to a token, an aspect of a method to be performed by a confidential information management system in accordance with one embodiment of the invention.

FIG. 3 is a flow diagram illustrating bonding a biometric signature to a token, an aspect of a method to be performed by a confidential information management system in accordance with one embodiment of the invention. A blank token 102 is designed to accept, upon first initialization, a digital signature correlating to the results of a captured biometric characteristic of the token owner. Upon the entry of the digital signature, the confidential information management system executes an algorithm that bonds the digital signature from the biometric generator, scanner 101, to token 102, randomly generates a unique digital private key for strong encryption; and sets token 102 to remain locked upon subsequent initializations unless presented with a digital biometric signature having a sufficiently high correlation to the original bonded digital signature such that positive identification is assured.

Referring to FIG. 3, in one embodiment, blank token 102 is presented to data console 103 at block 301. Console 103 activates scanner 101 at block 302. Scanner 101 obtains biometric signature 110 of the token owner at block 303. In block 304, scanner 101 sends biometric signature 110 of the token owner at block 303. In block 304, scanner 101 sends biometric signature 110 to token 102. The biometric signature 110 is bonded to token 102 in block 305 and token 102 generates an encryption key, block 306, which is entered on token 102. At block 307, token 102 locks and requires biometric signature 110 to open.

Data credibility can be enhanced by controlling who can enter data and by binding the identity of the data entry operator to each piece of data so entered. Specifically, for a token 102 to be "opened" to enter new data, it must be presented with the biometric digital signature of the token owner. For a data console 103 to add data to an opened token 102, the console 103 must be presented with the opened token 102 of a data entry person containing a data entry authorization code. In some embodiments, a data authorization code identifies the scope of data for which the data entering person has credibility. For example, a person with a DMV authorization code might be able to enter credit information, but the credibility of that information would be "zero" because the scope of the credible information of the data enterer only embraces the type of information acquired by the DMV. Additionally, if it is learned that a particular data entry person/entity is unreliable, such information can be broadcast so that the credibility coefficient of the data entered by such a person can be reduced. This technique is further described in FIG. 4.

Figure 4:
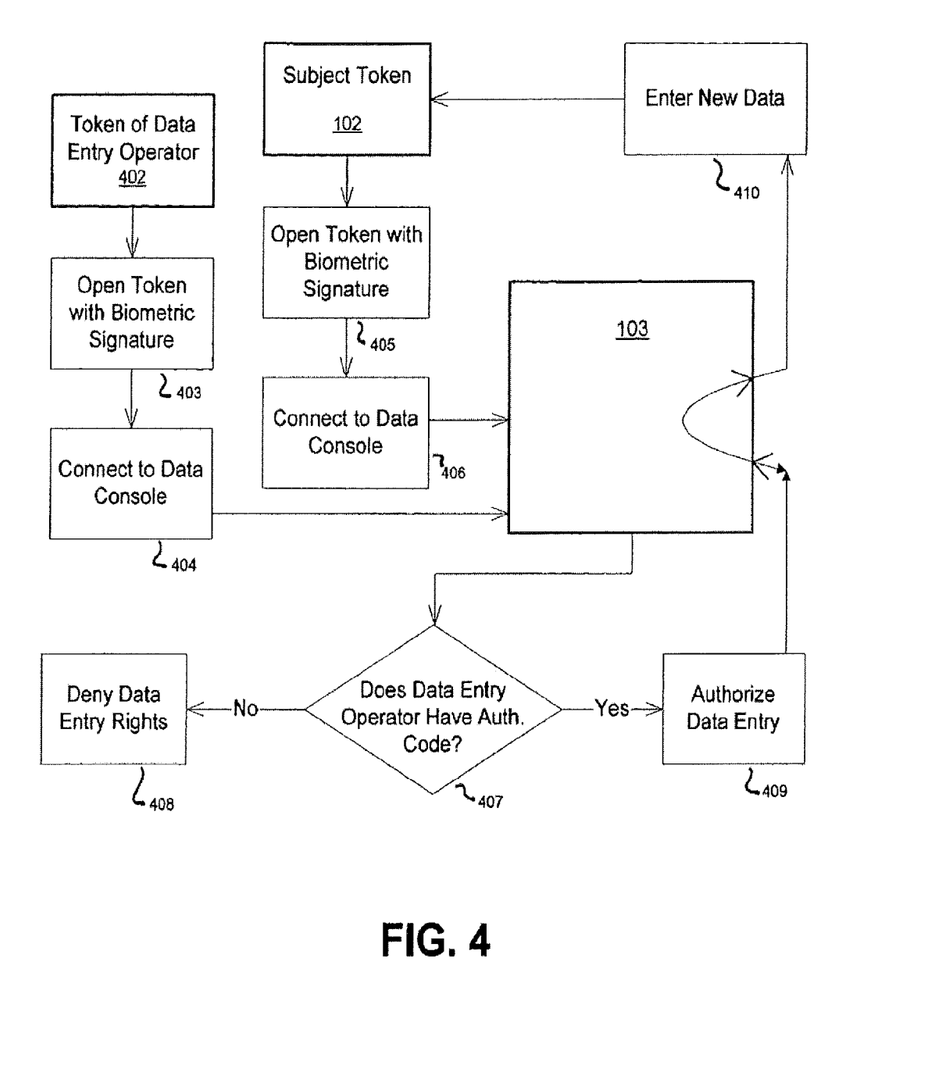
FIG. 4 is a flow diagram illustrating adding personal data to the token, an aspect of a method to be performed by a confidential information management system in accordance with one embodiment of the invention.

FIG. 4 is a flow diagram illustrating adding personal data to the token, an aspect of a method to be performed by a confidential information management system in accordance with one embodiment of the invention. As shown, to enter data onto a token 102, one must possess a data entry authorization code. The code is issued by a trusted third party, and is bonded to the token of the party so authorized. For a token 102 to have data added to it, the token 102 must be opened using the biometric signature of the token owner, and the data console 103 must be presented with the biometrically opened token of a party possessing a data entry authorization code. The console 103 is used to enter the data, which is then bonded to the token 102 along with the identification of the authorization information of the data entry operator.

Referring to FIG. 4, in one embodiment, an individual presents her token 102 for a transaction which involves adding data to the token, for example, during a transaction where sales history will be stored on the token 102. In block 405, token 102 is opened using the same method shown in FIG. 3. The individual's biometric signature is obtained and compared to the biometric signature stored on token 102 and upon confirmation, the individual is given access to data console 103, as depicted in block 406. The data entry operator's token 402 is opened using the same process, block 403, and the data entry operator is given access, block 404, to data console 103. In addition, an authorization code bonded to the data entry operator's token is tested, block 407. If the authorization code is absent or incorrect, data entry is denied, block 408. However, if a valid data entry authorization code is used then the scope of reliable information associated with that code can be used as part of the calculation of the credibility coefficient. If the authorization code is present and correct, block 407, data entry is authorized, block 409, the data entry operator is allowed access to the data console 103, and new data can be entered, block 410, onto the individual's token 102.

In one embodiment, each piece of personal or other confidential data entered on token 102 can carry a credibility weight based upon the various credibility coefficients attached to it. For example, each piece of confidential information entered onto a token 102 may be linked to: (a) a specific scanner 101; (b) a specific scanner operator; (c) a specific date and time; and (d) a specific data entry authorization code. If the credibility of any of those elements of the data entry process is called into question, the credibility coefficient of the confidential data in that record may be appropriately reduced and broadcast to all data consoles and to all parties authorized to query tokens. The broadcasting of such credibility information could work much like the current system in place for notifying vendors of stolen credit card numbers. An example of a data record and credibility coefficient for an individual for a specific entry date is illustrated in Table 1.

the party adding data must activate the data entry function in the console by presenting their own biometrically opened token possessing a data entry authorization code. That code will contain the credibility coefficient of the party entering data, which will be limited to a specifically delimited type of data. For example, a querying party may query about creditworthiness and find a data point entered by a DMV data entry authorization code. The querying party could calculate the credibility of that data point as "zero" because a DMV date entry authorization code does not have credible access to credit information.

TABLE 1

| Serial No. of scanner that opened token of owner (Scanner 1) | Serial No. of scanner that opened token of Data entry operator (Scanner 2) | Digital sign of Scanner 1's op. | Digital sign of Scanner 2's op. | Serial No. of data console | Data entry authorization code | credibility coefficient |
|---|---|---|---|---|---|---|
| AZ9993420 | BN087923 | 011100011010010001 | 0110100111101010 | AK5950102 | 98720 | 8/10 |

In some cases a party trusted for purposes of guaranteeing the credibility of certain types of data may not necessarily be reliable with respect to other types of data. Therefore, the relative trustworthiness and security of all entities being granted data entry authorization codes is "baked into" the data entry authorization code, and thus into every piece of data put onto a token 102. As a result, the data entry authorization code has a credibility coefficient limited to certain data types. If data of other types is entered, the credibility coefficient may be zero.

Figure 5:
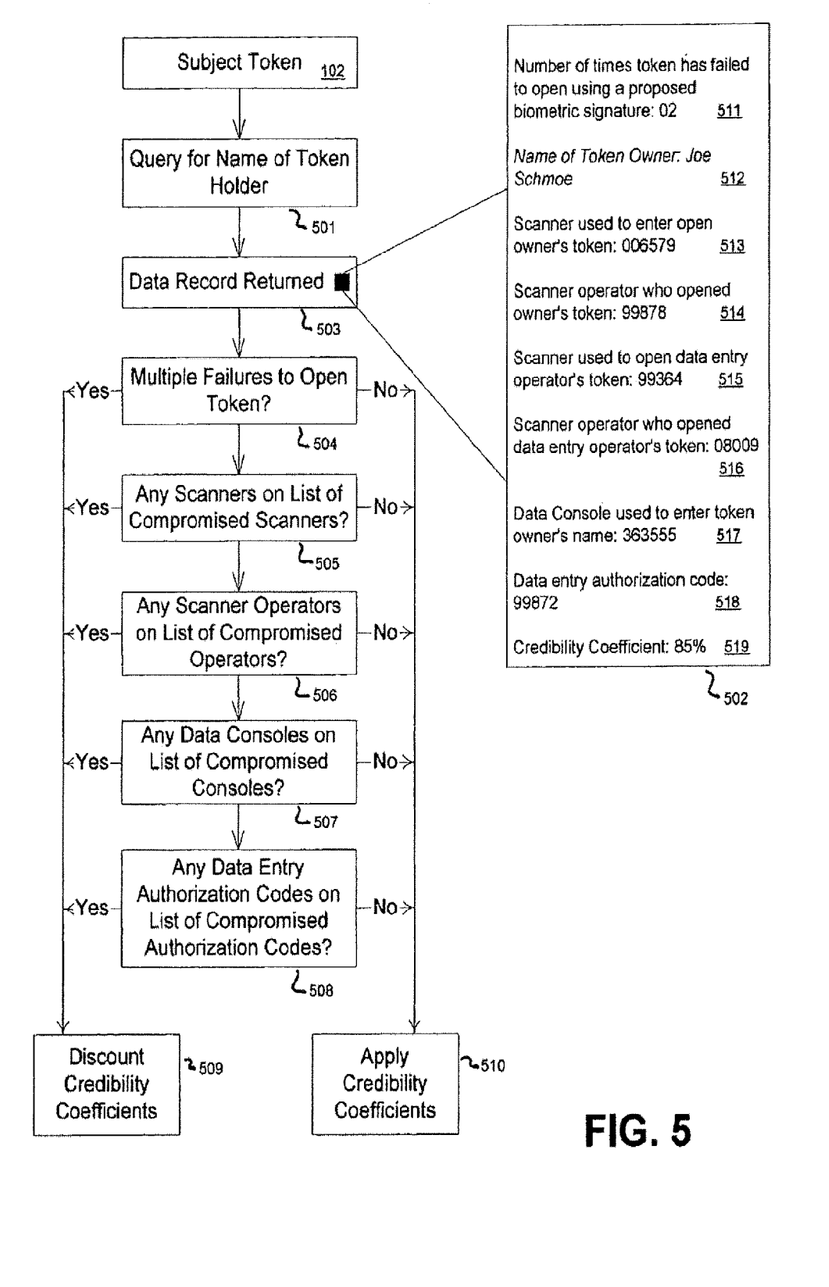
FIG. 5 is a flow diagram illustrating methods of ensuring data credibility, an aspect of a method to be performed by a confidential information management system in accordance with one embodiment of the invention.

FIG. 5 is a flow diagram illustrating methods of ensuring data credibility, an aspect of a method to be performed by a confidential information management system in accordance with one embodiment of the invention. In particular, FIG. 5 illustrates a generalized embodiment of ensuring data credibility in accordance with one embodiment of the invention. Each data record entered onto a token 102 may contain, as part of the record, data relating to the entry or acquisition of, and access to, the data record that affects the credibility of the data.

In one embodiment, the digital serial number of the biometric scanner 101 used to acquire the digital signature may be included in the data record. In the event it becomes known that a particular biometric scanner 101 has become compromised, the digital serial number of that scanner 101 can be published, and the credibility coefficient of any data record created with that scanner 101 can be appropriately reduced, potentially to zero. A data record entered onto a token 102 may contain as part of the record, the digital signature of the biometric scanner operator. In the event it becomes known that a particular biometric scanner operator is unreliable, the digital signature of that scanner operator can be published, and the credibility coefficient of any data record created by that scanner operator can be appropriately reduced-potentially to zero. Similarly, in the event that multiple failures to open a token 102 occur, the credibility coefficient of any data record on that token 102 can be appropriately reduced.

Each piece of data entered onto a token will further contain, as part of the data record, a data credibility coefficient indicating the relative trustworthiness of the data. Credibility coefficients may be assigned to specific operators of specific biometric scanners, for example by a trusted private party through the issuance of data entry authorization codes. To enter data onto a token, the token may be opened with the biometric digital signature of the token owner, and For example, authorized trusted workers at a state DMV office may be authorized to enter driver's license information on a token with a high credibility coefficient. Other parties attempting to add such data would have a credibility coefficient of zero, resulting in a negation of reliance on such information. Further, data about, for example, academic records, entered by a DMV official would also receive a low credibility coefficient when calculated by a querying party.

In the embodiment depicted in FIG. 5, token 102 is queried for the name of the token holder in block 501. Data record 502 returned in block 503 includes the number of times token 102 has failed to open using a proposed biometric signature 511, the name of the token owner 512, an identifier of the scanner used to open owner's token 513, an identifier of the scanner operator who opened owner's token 514, an identifier of the scanner used to open data entry operator's token 515, an identifier of the scanner operator who opened data entry operator's token 516, an identifier of the data console used to enter token owner's name 517, a data entry authorization code, a credibility coefficient 519. Data records may include these same fields or different fields depending on the embodiment.

In FIG. 5, various items in the data record 502 are used to determine a credibility coefficient. The credibility coefficient is discounted in block 509 or used without change (applied) in block 510 depending on the values of the data items. In block 504, a record of multiple failures to open token 102 results in a discounted credibility coefficient; as does any scanners on the list of compromised scanners, block 505; any scanner operators on the list of compromised operator, block 506; any data consoles on the list of compromised consoles, block 507; and any data entry authorization codes on the list of compromised authorization codes, block 508.

The process of a metadata query allows a token owner to control whether to release specific confidential data to a querying party, or to release the results of a metadata query allowing the querying party to evaluate the answer to a specific question. By protecting the confidentiality of the metadata query contents, token owners are prevented from "gaming the system" by accumulating specific data known to be important for a particular application.

Figure 6:
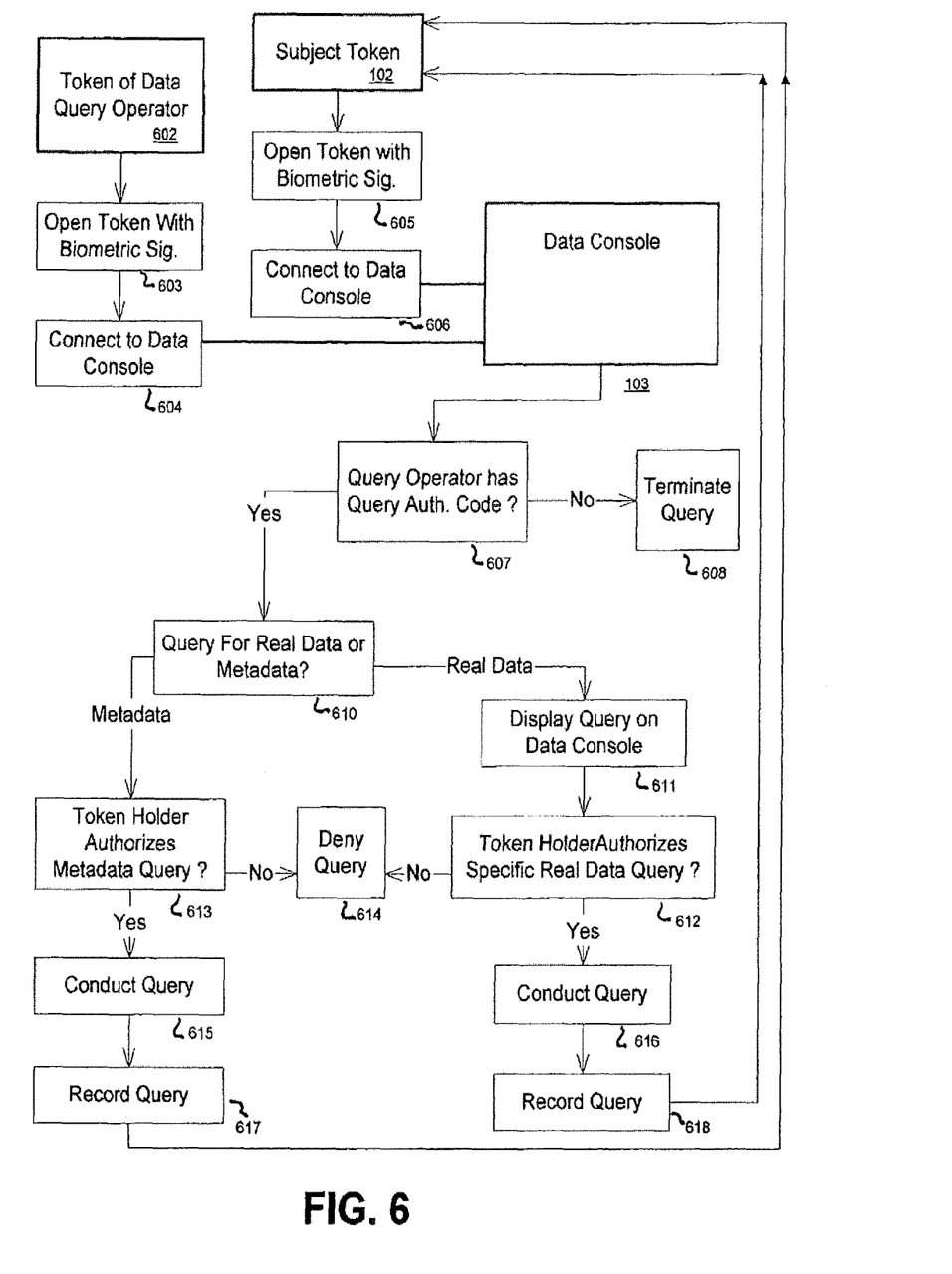
FIG. 6 is a flow diagram illustrating a method of querying data on a token, an aspect of a method to be performed by a confidential information management system in accordance with one embodiment of the invention.

FIG. 6 is a flow diagram illustrating a method of querying data on a token, an aspect of a method to be performed by a confidential information management system in accordance with one embodiment of the invention. In particular, FIG. 6 illustrates a generalized embodiment of querying data in accordance with one embodiment of the invention. In some embodiments, one way to query data on a token involves using a data query authorization code. The code is issued by a trusted third party, such as a bank, etc., and is bonded to the token of the party so authorized.

In block 605, the subject token 102 is opened using the biometric signature of the token owner. As discussed above, the biometric characteristic of the subject is scanned and compared to the biometric signature stored on the token 102 and if there is a match, the token is opened allowing a connection to the data console 103 at block 606.

In block 603, the token of the data query operator is opened using the biometric signature of the data query operator by the same technique discussed above and console 103 must be presented with a biometrically opened token which contains a data query authorization code, shown in block 604. At block 607 the data query authorization code is checked. In some embodiments, if the token of the data query operator lacks a credible authorization code, the query is terminated, block 608. In other embodiments, if a data query operator lacks a credible authorization code, a token owner could engage in a preemptive or real time data exchange with the token of the querying party to determine whether the token owner is willing to disclose the requested information.

In block 610, Console 103 is used to enter the data query, and the nature and extent of the query is displayed on the console display for the token owner's review. If disclosure of specific (real) confidential information is asked for, the console displays the query, block 611. The token owner will either authorize or deny release of such information, block 612. The token owner can either deny the query, block 614, or authorize the query, in which case the query is conducted at block 616. If a metadata query is presented, such query is not displayed on the console, but the token owner is requested to authorize release of the metadata, block 613. The token owner can either deny the query, block 614, or authorize the query in which case the query is conducted at block 615.

In one embodiment, for example, the query might ask for release of specific confidential information, such as name and driver's license number, or it might ask for metadata, such as whether the specific data on a token reflects that the token owner is a good risk for a car rental.

An example of metadata query is illustrated in Table 2. The query is for admission onto an Oregon political action campaign mailing list.

TABLE 2

| Query | "Yes" Value | "No" Value | x | Credibility Rating | = | Total Value |
|---|---|---|---|---|---|---|
| Oregon Resident? | 20 | — | x | 3 | = | 60 |
| Over 18 years old? | 10 | — | x | 4 | = | 40 |
| Registered to vote? | — | −7 | x | 6 | = | −42 |
| Democrat? | 15 | — | x | 2 | = | 30 |
| Metadata Query Return Value | | | | | | 88 |

In this example, the issue is whether to offer the token holder admission onto a Democratic Party political action campaign mailing list. The mailing list owner determined that a minimum score of 100 would be required before admission onto the list would be offered. In Table 2, the credibility rating can be a predetermined rating, or can be calculated from the metadata associated with each of the other relevant data points or calculated from the data, etc. The facts that there was highly reliable information that the person was not registered to vote and only weakly reliable information that the person was a Democrat disqualified this person from being offered admission. This decision was made without the disclosure of any confidential information. The only thing the querying party received from this process was a score of 88.

To protect the integrity of the system, a process is provided for evaluating if and when data queries are used in an unintended, abusive manner. At block 617 and block 618 a record of the query is stored on token 102. Because each entity querying a token must have a data query authorization code or must present other credible information identifying the querying party as suitable for the query, a record of each query made, including the identity of the querying party, the biometric scanner involved, the date and time of the query, and the nature and extent of each data release can be placed on a token. This information is potentially useful to a token owner in case someone abuses the querying process or the disclosure of confidential data. It is also potentially useful information for law enforcement agencies with appropriate subpoenas. However, as discussed above, this information would generally be locked to all parties to prevent them from "gaming the system."

Figure 7:
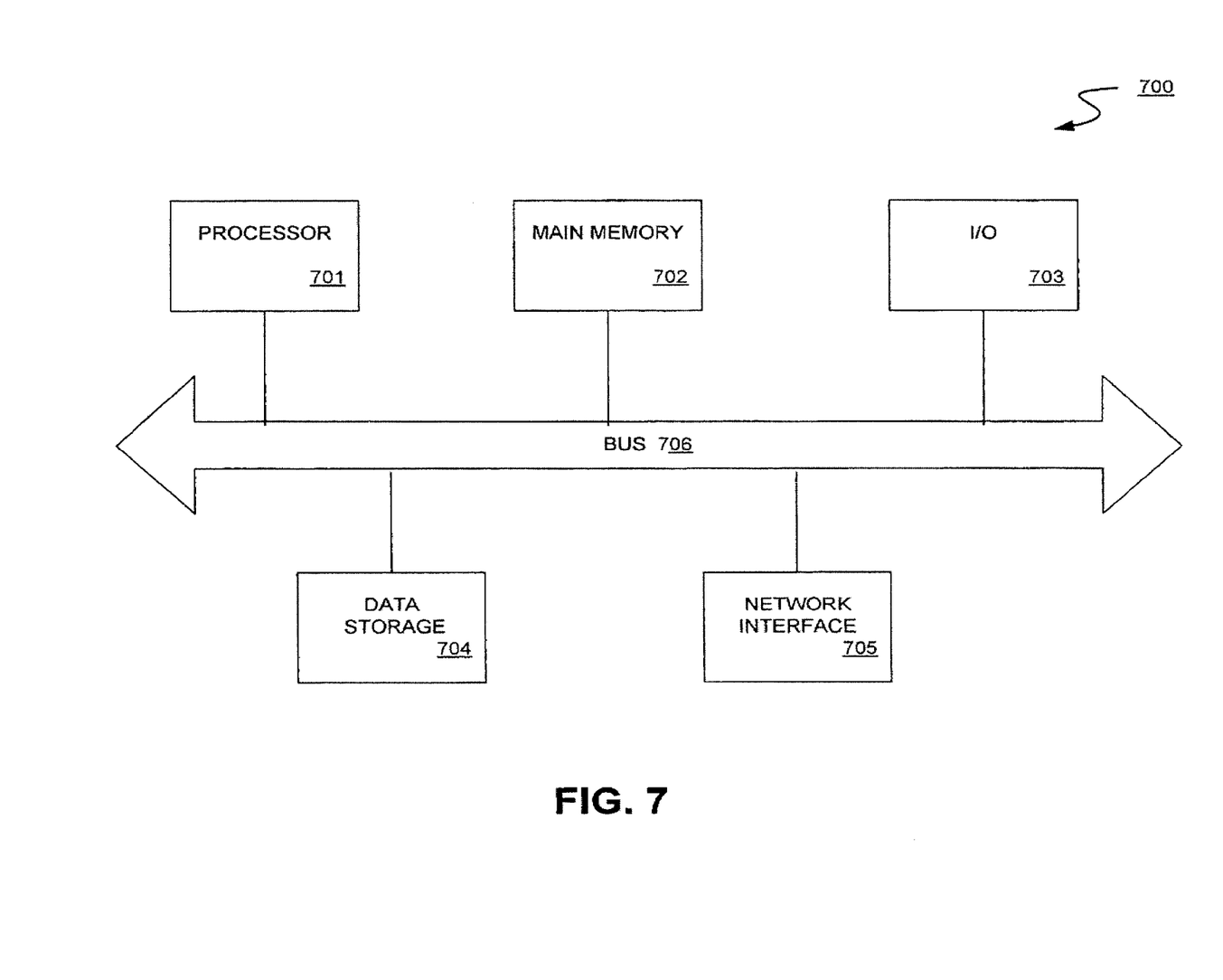
FIG. 7 illustrates one embodiment of a suitable computing environment in which certain aspects of the invention illustrated in FIGS. 1-6 may be practiced.

FIG. 7 illustrates one embodiment of a suitable computing environment in which certain aspects of the invention illustrated in FIGS. 1-6 may be practiced. In one embodiment, certain aspects of the confidential information management system may be implemented on a computer system 700 having components 701-706, including a processor 701, a memory 702, an Input/Output device 703, a data storage 704, and a network interface 705, coupled to each other via a bus 708. The components perform their conventional functions known in the art and provide the means for implementing the confidential information management system. Collectively, these components represent a broad category of hardware systems, including but not limited to general-purpose computer systems as well as special-purpose devices.

In one embodiment, the memory component 702, may include one or more of random access memory (RAM), and nonvolatile storage devices (e.g., magnetic or optical disks) on which are stored instructions and data for use by processor 701, including the instructions and data that comprise the components of the confidential information management system.

In one embodiment, the network interface component 705 may include the means for broadcasting metadata, data, the credibility coefficient data, etc. The data storage component 704 may also represent the various pieces of data in the data console or biometric generator, including the signatures and other information used by the confidential information management system.

It is to be appreciated that various components of computer system 700 may be rearranged, and that certain implementations of the present invention may not require nor include all of the above components. Furthermore, additional components may be included in system 700, such as additional processors (e.g., a digital signal processor), storage devices, memories, network/communication interfaces, etc.

In the illustrated embodiment of FIG. 7, the method and apparatus for a confidential information management system in accordance with one embodiment of the invention as discussed above may be implemented as a series of software routines executed by computer system 700. The software routines may comprise a plurality or series of instructions, code sequences, configuration information, or other data to be accessed and/or executed by a processing system such as one or more of processor 701. Initially, the series of instructions, code sequences, configuration information, or other data may be stored on data storage 704 and transferred to memory 702 via bus 708. It is to be appreciated that the series of instructions, code sequences, configuration information, or other data can be stored a data storage 704 using any conventional computer-readable or machine-accessible storage medium, such as a diskette, CD-ROM, magnetic tape, DVD, ROM, smart card etc.

It is also to be appreciated that the series of instructions, code sequences, configuration information, or other data need not be stored locally, and could be stored on a propagated data signal received from a remote storage device, such as a server on a local or worldwide network, over distributed servers in a cloud computing environment, via a network/communication interface 705. The instructions, code sequences, configuration information, or other data may be copied from the data storage 704, such as mass storage, or from the propagated data signal into a memory 702 and accessed and executed by processor 701. In alternate embodiments, the present invention is implemented in discrete hardware or firmware. For example, one or more application specific integrated circuits (ASICs) could be programmed with some or all of the above-described functions of the present invention.

Figure 8:
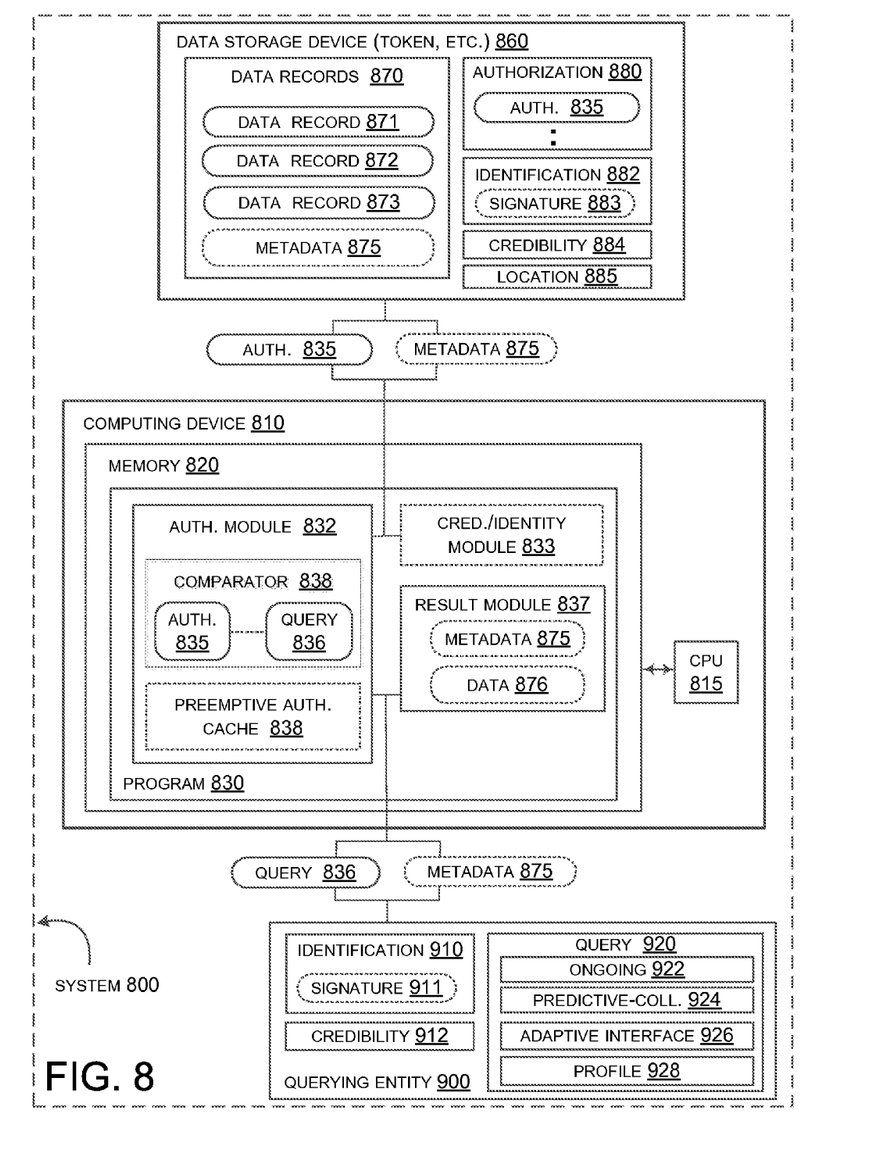
FIG. 8 is an example environment illustrating a system for preemptive authorization of confidential information.

FIG. 8 illustrates one embodiment system 800 for preemptive authorization for the exchange of confidential information. Generally, embodiment system 800 allows for disclosure of an intended set of information from a confidential information store on a data storage device 860. Examples of an intended set of information that may be disclosed include metadata 875 or a specifically selected subset of data 876 out of a confidential information store such as data records 870.

Some embodiments in this disclosure teach a system, method or apparatus for real time authorization by a token owner of a predetermined subset of information out of a confidential information store in response to a real-time query. The embodiment illustrated in system 800 also provides for automatic disclosure by a token holder of subset of information out of a confidential information store in response to a real-time query. For example, a token owner may pre-authorize the disclosure from her token specific data or metadata responses in connection with specific queries, and/or specific querying parties identified with specific levels of credibility. In this way, a query that matches what has been pre-authorized allows a disclosure of only intended information from a confidential store of information with little or no involvement from the owner of the information.

System 800 describes an embodiment using a data storage device 860. Although the storage place could be a device, it could also be distributed through multiple devices, including cloud model storage, as an example. Additionally, preauthorization of a selected disclosure of data as described herein may be used for many different purposes, such as confirmation of: (i) a right to vote; (ii) a right to access or use a device or equipment; (iii) a right to access a facility or vehicle; (iv) a right to access information or funds; (v) a right to cross borders; (vi) a right to be employed; or (vii) a right to consummate a commercial transaction, as non-limiting examples. Each of these examples may be referred to in a general manner as a "transaction." Example system 800 will be described in more detail with reference to FIG. 8 in the following paragraphs.

System 800 includes a data storage device 860, a computing device 810, and a querying entity 900. While system 800 illustrates these as separate devices, they may also share hardware with each other. For example, computing device 810 may reside in the same hardware device as data storage device 860 or querying entity 900, or all three may be functional implementations in software or hardware within the same device. For ease of illustration, the current description describes the three elements of system 800 as stand-alone devices.

Data storage device 860 includes one or more data records 870 that contain confidential data and other data. Data storage device 860 also includes an authorization block 880 that can store one or more specific preemptive authorizations 835, identification block 882 which may include a digital signature 883, a credibility block 884 and location services 885 such as GPS, cellular location services, or other location based services.

In data storage device 860, authorization 835 provides a preemptive authorization for a certain type of query, for a certain type of querying entity, for a certain amount of time, etc. The authorization may also specify a portion of data records 870 that may be disclosed, a portion of any individual record that may be disclosed, a metadata disclosure, etc. In this way, the authorization allows an owner of the confidential information on data storage device 860 to control what sort of entity can run a query on the confidential information, to control what type of query can be run, and to control what portion of the confidential information, or metadata generated based on the confidential information, can be disclosed. Examples of preemptive authorizations will be explained in more detail after describing the main functional blocks in system 800.

Additionally, identification block 882 and signature 883, and/or credibility block 884 can provide a trusted relationship for a querying party to establish that the query of confidential information will result in trustworthy data or metadata. For example, credibility block 884 can include a credibility rating or coefficient that can apply to each of the data records 870 to establish a trust level of any data or metadata being disclosed. A credibility rating or coefficient can be a predetermined rating, or can be calculated from the metadata associated with each of the other relevant data points or calculated from the data, etc. In this way a query can be run anonymously on the confidential information and a querying party can determine the extent to which it can rely upon the veracity of the disclosed information while the owner of the confidential information remains anonymous. This is not required, however, and credibility block 884 or identification block 882 and signature 883 may also be used in disclosures where the owner does not remain anonymous.

Computing device 810 has a CPU 815, and a program 830 residing within memory 820. In the embodiment illustrated in FIG. 8, computing device 810 receives a preemptive authorization 835 from data storage device 860. After receiving a preemptive authorization, computing device 810 may receive a query 836 from a querying entity 900. If the querying entity 900 is authorized either specifically or generically by authorization 835, then computing device 810 will submit the query to data storage device 860 which then will provide metadata 875. While system 800 illustrates metadata 875 being provided from data storage device 860 to computing device 810, data 876 may be provided in similar fashion, wherein data 876 can be a subset of data specifically authorized for disclosure from data records 870.

Program 830 includes an authorization module 832 including a comparator 838 which compares preemptive authorization 835 to a query 836 to determine if a querying entity 900 may run a query on data on data storage device 860. Authorization module 832 may also include a preemptive authorization cache 838 to store one or more authorizations 835 to respond to queries in an ongoing manner. Program 830 may also include a credibility/identity module 833 in communication with authorization module 832 to verify data storage device 860 or querying entity 900. Program 830 further includes a result module 837 in communication with authorization module 832, where result module 837 can generate or provide metadata or data 876 that is a result of a query run on data storage device 860 which can then be forwarded to querying entity 900. We will now describe querying entity 900 in more detail.

Querying entity 900 includes an identification block 910 which may include a signature 911. Querying entity 900 also includes a credibility block 912, and a query block 920, which itself includes one or more types of queries, such as ongoing query 922, predictive-collaborative query 924, adaptive interface query 926, and profile query 928, as examples. In this way, after a type of query has been preemptively authorized by authorization 835, querying entity 900 can submit a query 836 to computing device 810, for example one of the queries in query block 920 or a separate query, and computing device 810 can then determine if the query 836 may be run based on the authorization 835 and identifying information or a credibility determination based on querying entity 900 or the query 836 itself. If the query 836 is authorized by authorization 835, then the query 836 may be run on data storage device 860. Example queries are described below in more detail in specific use cases that utilize system 800.

System 800 will now be described by way of specific use case examples. A preemptive data/metadata disclosure authorization allows an owner of confidential information to preemptively open selected data on a data storage device for ongoing access to the public or to querying parties who can show a generic qualification for accessing the confidential information. For example, an owner of confidential information, or token holder, may preemptively grant qualified vendors of a particular product or service the ability to "bid" their product or service to the token owner based upon the token owner's purchaser qualification data being preemptively authorized for disclosure.

For example, a token owner interested in buying a truck could preemptively disclose either real data 876 or metadata 875 concerning the token owner's interest in purchasing, and financial ability to purchase, a truck. The token owner could preemptively authorize disclosing selected data records 870 such as: (i) annual income; (ii) credit rating; (iii) driving record; (iv) general geographic location; and (v) the age and model of the token owner's current vehicle, which a vendor, querying party 900, might then use to create a direct "bid" for a truck sale to the token owner. Additionally, the token owner might preemptively open the token 860 for metadata queries 836 within a relevant scope of inquiries. For example, the token owner might provide a vendor an answer to specific queries such as "is the potential customer's annual income in excess of $100,000?"; "does the potential customer have a credit score greater than 650?; or "Does the potential customer currently own a truck over five years old?"

One benefit of preemptively being able to authorize a data or metadata disclosure is that by using data with known credibility coefficients, both the token owner and potential vendors can preemptively negotiate for an exchange of selected information in order to evaluate a transaction, commercial or otherwise. For example, this would constitute closely targeted marketing while at the same time preserving customer anonymity.

In some embodiments, location based information may be stored or generated in location block 885 and may be used to evaluate a potential commercial transaction or data/metadata disclosure. For example, in a mobile device, the data point of a token owner's current GPS coordinates may be used for evaluation of a potential transaction. Furthermore, a token owner may control user selected proximity to the GPS coordinates to preemptively authorize a disclosure or as a factor in a preemptive authorization.

In another specific use case example, system 800 could also facilitate a token owner's receipt of predictive-collaborative information 924. In a current use of predictive-collaborative analytics, online retailer Amazon evaluates a database of purchasing activity to be able to advise potential customers that other people who purchase an item x were also interested in an item y. By preemptively authorizing ongoing disclosure of selected data or metadata to an authorized querying entity 900, for example recipients qualified to the satisfaction of the token owner by the recipient's own token information, a token owner could facilitate the receipt of predictive-collaborative information 924 whether that information is related to potentially interesting commercial transactions or otherwise. For example, authorization 835 can be for a querying entity 900 that is known to use predictive-collaborative information, or for a query 836 specifically disclosing it will use the results of the query to provide predictive collaborative information such as predictive-collaborative query 924, etc. Then once query 836 is submitted to computing device 810, preemptive authorization 835 is satisfied and querying entity can query one or more data records 870 and then provide predictive-collaborative information on an ongoing basis based on the resulting metadata 875 or data 876 generated as a result of the query 836.

In another specific use case example, an ongoing voluntary disclosure of anonymous data for public research purposes may be preemptively authorized with system 800. For example, it is becoming increasingly common for researchers to look at group-sourced data for epidemiological analyses, health issues, etc. By preemptively authorizing ongoing access to data or metadata in data records 870 for such purposes, researchers could acquire large amounts of data for legitimate research purposes. For example, the potential disclosure can be authorized according to the token owner by the researcher's own token information. Furthermore, the data can be provided with known credibility coefficients or credibility coefficients can be calculated on some or all of the data, metadata, etc. and assigned to the data.

In this example, an ongoing query 922 may be preemptively authorized in authorization 835 and stored in preemptive authorization cache 838. Once the query is preemptively authorized, querying entity 900 may submit a query 836 of data or metadata in data records 870 of multiple data storage devices 860 and in this way implement group-sourced data for epidemiological analysis, health issues, etc. without disclosing other confidential information, such as personal identity, from data records 870.

An additional group-sourced specific-use case example of system 800 involves the consummation of commercial licensing of solutions. It is currently common for people to use the internet to "group source" things, from consumer preferences, to political opinions, to micro-funding, to product design, to problem solving. Several major industries, such as the pharmaceutical industry, operate websites upon which technical problems are posted for which the posting company has not been able to provide a solution. In this example, a website allows members of the public to submit solutions, in turn utilizing a valuable resource in the interested readership that may solve a problem not yet solved. In this way, a preauthorized disclosure may facilitate (i) posting solutions for group-sourced problems; (ii) qualifying solution submissions in a manner that allows the poster to use the submitter's metadata to determine whether the solution will be reviewed; and (iii) potentially allowing for data fields containing a pre-negotiated fees and license terms for either reviewing the solution or licensing the solution.

Another specific-use case example of system 800 provides for voluntary disclosure of anonymized data for social networking or engagement purposes. It is becoming common for strangers to identify each other, through social media tools, to determine whether there is a mutual interest in engaging in a social relationship. By preemptively authorizing the disclosure of anonymous data for such purposes, potential acquaintances may acquire selected socially relevant data about each other for the purpose of deciding whether to initiate a social or other relationship.

For example, a credibility rated health status of each potential acquaintance can be utilized to determine who an owner of confidential information may want to disclose data to in response to a query 836. Specifically, token owner may preauthorize disclosure of data 876 or metadata 875 related to social networking or engagement purposes in response to specifically preauthorized queries or to preauthorized querying entities. Additionally, location based data may be used as a portion of a preemptive authorization since then people within the same geographic proximity could follow up on a decision to initiate a social relationship with immediate personal contact.

In another example specific-use case, system 800 could be used for transactions between token owners and querying entities 900 with devices that automatically customize themselves to interface with the token owner in accordance with information the token owner preemptively discloses to authorized recipients. For example, the token owner could preemptively authorize disclosure, to pre-authorized ATM machines, that the token owner is visually impaired. The recipient ATM could automatically respond to the information by increasing font size or switching to auditory transaction mode. This process could be implemented to automatically accommodate for physical impairments such as sight or hearing impairments, for learning impairments or preferences such as adjusting for "visual learners," "auditory learners," ADD people, etc., or for simple personal preferences that are captured as data points on a token such as "no garlic" on any food order, etc. In each case, the information disclosed could be either data 876 or metadata 875, similar to the specific-use case examples above.

Accordingly, a novel method and system is described for a method and apparatus for a confidential information management system. From the foregoing description, those skilled in the art will recognize that many other variations of the present invention are possible. Thus, the present invention is not limited by the details described. Instead, the present invention can be practiced with modifications and alterations within the spirit and scope of the appended claims.

The invention claimed is:

1. A computing device having memory and a processor and for preemptive applications of a confidential information management, the computing device comprising:
   an authorization module including a comparator stored in memory and executable in the processor to compare a preemptive authorization to a query to determine if a querying entity may run a query on data on a data storage device;
   an identity module coupled with the authorization module, the identity module being configured to verify at least one of the data storage device and the querying entity; and
   a result module configured to provide at least one of metadata or data from the data storage device in response to the authorization module authorizing the comparison between the query and the preemptive authorization.

2. The computing device of claim 1, further including a preemptive authorization cache to locally store authorized comparisons between a query and a preemptive authorization.

3. The computing device of claim 1, wherein the preemptive authorization is received from a data storage device and the query is received from a querying entity.

4. The computing device of claim 1, wherein the result module retrieves the data or metadata from the data storage device in response to the authorization module authorizing the comparison between the query and the preemptive authorization.

* * * * *